(12) United States Patent
Lee

(10) Patent No.: US 9,727,973 B2
(45) Date of Patent: Aug. 8, 2017

(54) IMAGE PROCESSING DEVICE USING DIFFERENCE CAMERA

(71) Applicant: Moon Key Lee, Seoul (KR)

(72) Inventor: Moon Key Lee, Seoul (KR)

( * ) Notice: Subject to any disclaimer, the term of this patent is extended or adjusted under 35 U.S.C. 154(b) by 107 days.

(21) Appl. No.: 14/437,256

(22) PCT Filed: Oct. 19, 2013

(86) PCT No.: PCT/KR2013/009365
§ 371 (c)(1),
(2) Date: Apr. 21, 2015

(87) PCT Pub. No.: WO2014/065544
PCT Pub. Date: May 1, 2014

(65) Prior Publication Data
US 2015/0294478 A1    Oct. 15, 2015

(30) Foreign Application Priority Data

Oct. 22, 2012 (KR) .......................... 10-2012-0117563
Dec. 18, 2012 (KR) .......................... 10-2012-0148983

(51) Int. Cl.
*G06K 9/00* (2006.01)
*G06T 7/00* (2017.01)
*G06K 9/68* (2006.01)
*G06T 1/00* (2006.01)
(Continued)

(52) U.S. Cl.
CPC .............. *G06T 7/0085* (2013.01); *G06K 9/00* (2013.01); *G06K 9/68* (2013.01); *G06T 1/0007* (2013.01); *G06T 7/254* (2017.01); *H04N 5/225* (2013.01); *G06K 2209/03* (2013.01); *G06K 2209/21* (2013.01); *G06T 2207/10004* (2013.01); *G06T 2207/10024* (2013.01); *G06T 2207/20101* (2013.01); *G06T 2207/30204* (2013.01)

(58) Field of Classification Search
None
See application file for complete search history.

(56) References Cited

U.S. PATENT DOCUMENTS 8,217,997 B2    7/2012  Solomon et al.
2001/0010514 A1    8/2001  Ishino
(Continued)

FOREIGN PATENT DOCUMENTS

JP    7-121293 A    5/1995
JP    8-249471 A    9/1996
(Continued)

OTHER PUBLICATIONS

Korean Intellectual Property Office; International Search Report in International Patent Application No. PCT/KR2013/009365 (Jan. 22, 2014).

*Primary Examiner* — Sean Conner
(74) *Attorney, Agent, or Firm* — Leydig Voit and Mayer

(57) ABSTRACT

A fast and stable image processing system detecting a mark from a differential image is described. The system includes a display displaying a first image and a second image alternately. A camera captures the first image that contains a mark and the second image. An image processing device detects the mark from a non-zero pixel region of a difference image between the first image that is captured and the second image that is captured.

17 Claims, 1 Drawing Sheet

(51) Int. Cl.
*H04N 5/225* (2006.01)
*G06T 7/254* (2017.01)

(56) References Cited

U.S. PATENT DOCUMENTS

| | | | |
|---|---|---|---|
| 2002/0101364 A1* | 8/2002 | Lin | G06T 1/0007 340/988 |
| 2005/0046708 A1 | 3/2005 | Lim et al. | |
| 2010/0103099 A1* | 4/2010 | Lee | G06F 3/0317 345/158 |
| 2012/0319949 A1* | 12/2012 | Lee | G06F 3/0304 345/158 |

FOREIGN PATENT DOCUMENTS

| | | | |
|---|---|---|---|
| JP | 2001-249008 A | 9/2001 | |
| JP | 2001-325069 A | 11/2001 | |
| JP | 2004-7246 A | 1/2004 | |
| JP | 2010-539557 A | 12/2010 | |
| KR | 10-2008-0037315 A | 4/2008 | |
| KR | 10-0936816 B1 | 12/2008 | |
| KR | 10-2011-009176 A | 9/2011 | |
| KR | WO 2011108827 A2 * | 9/2011 | G06F 3/0304 |
| WO | WO 2010/024486 A1 | 3/2010 | |

\* cited by examiner

IMAGE PROCESSING DEVICE USING DIFFERENCE CAMERA

CROSS-REFERENCE TO PRIOR APPLICATIONS

This application is a U.S. National Phase application under 35 U.S.C. §371 of International Application No. PCT/KR2013/009365, filed on Oct. 19, 2013, and claims benefit to Korean Patent Application No. KR 10-2012-0117563, filed on Oct. 22, 2012 and Korean Patent Application No. KR 10-2012-0148983, filed on Dec. 18, 2012. The International Application was published in Korean on May 1, 2014 as WO 2014/065544 under PCT Article 21(2). Entirety of the prior applications PCT/KR2013/009365, KR 10-2012-0117563, and KR 10-2012-0148983 are incorporated by reference herein.

TECHNICAL FIELD

The present invention relates to a technology of fast detecting a mark from the non-zero pixel region of difference image between the previous frame and the current frame wherein the previous frame contains mark and the current frame does not contain mark.

BACKGROUND ART

Mark recognition, pointing, mouse, augmented reality, camera, difference image, image processing.

DETAILED DESCRIPTION OF THE INVENTION

Technical Problem

Recently, the pointing technology of capturing by a camera and recognizing the mouse cursor icon in a monitor from the captured image has been developed. The objective of present invention is to provide the fast and stable system which can detect the mouse cursor icon among the complex background image.

The other objective of present invention is to solve the problem that the system may confuse the object as the mouse cursor icon when the camera is not capturing the mouse cursor icon in the monitor but capturing the object in a surrounding environment which is not the monitor.

Technical Solution

The embodiments of the present invention describes an image processing system using camera which can detect mark quickly by outputting two kinds of images alternately and sequentially onto monitor screen, capturing the two images sequentially and comparing the captured two images.

Advantageous Effects

According to embodiments of the present invention, the mark detected quickly and stably by an image processing system using difference camera can be used for pointing or augmented reality and can also be used for robot to recognize its environment. The present invention of image processing system using difference camera calculates difference image, searches its pixel values in order to find region of high probability of existence of mark and detect mark from that region. If the camera is not capturing the computer display but capturing the nearby objects around the display, difference image does not contain the region of high probability of existence of mark and the image processing system stops searching the mark. Therefore, load on CPU and power consumption can be reduced. If not using the image processing system of present invention, load on CPU, the power consumption is high and the speed of recognition of mark becomes slow because the mark is assumed to be exist always in captured image and the image processing system always tries to detect mark from the captured image.

MODE OF THE INVENTION

Embodiment 1

Recently, the pointing technology of capturing by a camera and recognizing the mouse cursor icon in a monitor from the captured image has been developed. For example, there is a technology of Korean Patent Number 10-0936816 whose title is "Pointing device using camera and outputting mark." The technology was invented by the inventor of the present invention.

This above pointing technology includes an embodiment of image processing system which recognizes the mark from the odd number frame wherein the monitor displays mark image in odd number frame and displays ordinary image in even number frame.

Figure 1:
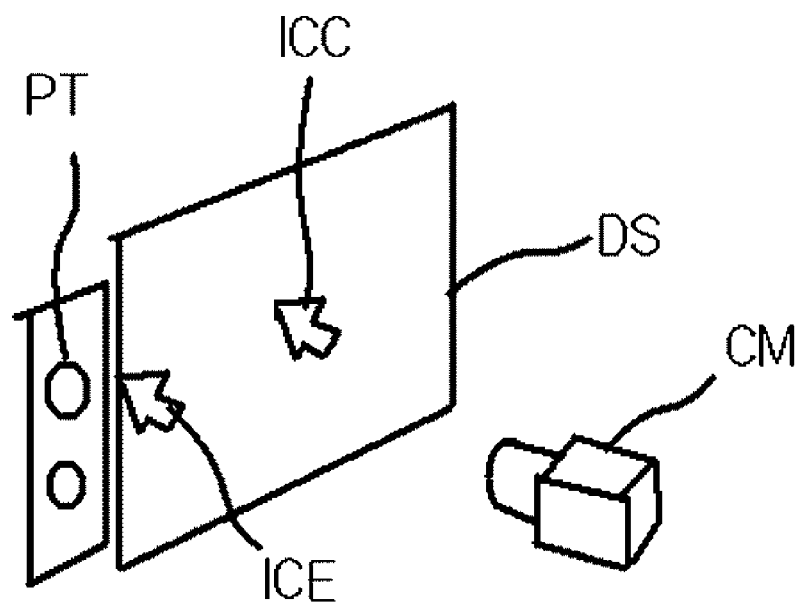
FIG. 1 shows a composition of a system according Embodiment 1.

As shown in FIG. 1, if the mark is mouse cursor icon ICC which is located at central region of monitor and there is sufficient clear margin around the mark, then it is easy to detect the mark. However, if the mouse cursor icon ICE is touching the boundary border of monitor screen (DS) of FIG. 1 and there is an object PT whose texture is similar to that of the mouse cursor icon ICE, then the image processing system may have difficulty to differentiate the mouse cursor icon ICE from the object PT outside of the monitor.

Especially, if there is the nearby object whose color or shape is similar to that of the mouse cursor, then the mark may not be detected.

Also, even if the mark is located at center of display, if the lens of camera is wide angle lens, or if the distance between the camera and the display is long, then the captured image may contain objects around the monitor, and the image processing system may spent time to differentiate the mouse cursor from the nearby object. The objective of the present invention is to solve the above problem and to provide the fast and stable image processing system.

In order to solve the above problem, the embodiments of the present invention includes a difference camera, displays alternately and sequentially a mark image MI and an ordinary image OI, captures sequentially the above two kinds of images, calculates the difference image of the captured two images, and detects a mark quickly and stably from the region of a non-zero pixel value of the difference image by deciding that a region of a zero pixel value of a difference image is not the display region and by excluding the region of the zero pixel value.

The pixel value of difference image is the difference of corresponding two pixel values of input images. For example, pixel value of difference image whose coordinate is (x,y) is the difference between the pixel values of two input images at coordinates (x,y). If the input images are noisy, then it is recommended to apply preprocessing, such as a Gaussian filter, to the two input images. It is recommended to display the mark image MI and ordinary image OI alternately at 60 times or more per second, and fast enough, such that human eye cannot sense the flicking of display. Such displaying is possible by using the shutter glass type 3-dimensional display whose display frequency is 120 Hz.

If the camera is standing still, then the pixel values of exterior of display DS in difference image are zero value and the pixel values of the interior of the display in difference image are non-zero.

Figure 2:
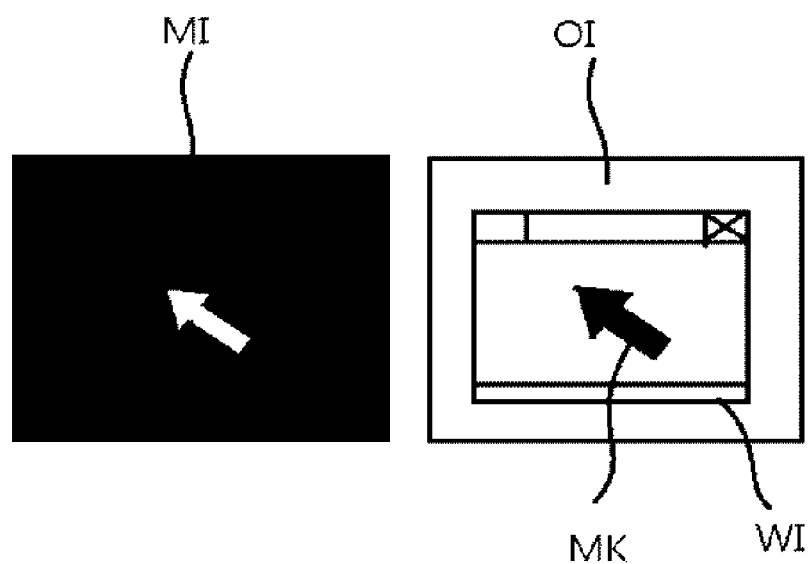
FIG. 2 shows a mark image and an ordinary image.

For example, in FIG. 1, even if the mouse cursor icon ICE comes close to the texture of object PT outside of display, the mark (mouse cursor Icon ICE) can be easily separated and detected from surrounding texture by searching the non-zero pixel value region of difference image, because the pixel value of the texture of object PT in the surrounding in difference image is zero, but the pixel value of the region of mouse cursor icon mark ICE is non-zero. Non-zero pixel value region in the difference image corresponds to the region of display. It is recommended to decrease the brightness of the region of ordinary image OI, wherein the region MK corresponds to the mark in mark image MI, so that the mark region MK can be detected easily as shown in FIG. 2. In this case, the corresponding regions mean that the corresponding regions overlap each other if the two images are superimposed.

For example, if the brightness of mark region MK of ordinary image OI is decreased as shown in FIG. 2, and the difference is defined as subtracting the ordinary image OI from the mark image MI, then the difference values of mark region MK are positive, and the difference values of region around the mark are zero or negative value, because the pixel values around the mark in mark image MI are 0 or very small value (dark pixels), and the pixel values of corresponding region in ordinary image OI are zero or positive value (bright pixels). Therefore, the positive pixel regions in the difference image have the high probability to contain the mark. The mark can be easily detected by searching such high probability regions in mark image MI. In the present invention, the first order difference image is defined as the difference between the ordinary image OI and the mark image MI.

If the camera stands still, then the pixel values of mark region MK in the first order difference image are positive, and the pixel values of the remaining region are negative or zero. However, if the camera is moving, then the pixel values of the boundary of mark and the object PT around display in difference image can be positive value. In this case, the mark region MK can be detected by removing the boundary regions of object PT from the positive pixel valued regions in the first order difference image. In the present invention, such removing of the boundary regions of objects from the first order difference image is defined as the second order difference.

It is recommended to calculate the boundary region from the mark image MI rather than ordinary image OI, because the boundary region from the ordinary image OI may also contain the boundary of object WI inside of display.

These are summarized as following:
(step 1) capture the mark image MI which is displayed
(step 2) capture the modified ordinary image OI wherein the modification means that the brightness of corresponding mark region MK in ordinary image is decreased.
(step 3) detect the positive pixel value region from the (first order) difference image between the above two captured images (the difference means the subtracting the ordinary image from mark image).
(step 4) detect the region of boundary of object from the mark image captured in step 1.
(step 5) detect mark from the region which is obtained by removing (second order difference) the boundary regions of step 4 from the positive pixel value region of step 3.

It is recommended to remove a slightly larger region that includes the boundary region in step 5. The faster speed of the motion of camera, it is the better to remove a larger region. In step 4, a Canny edge detector can be used to detect the boundary of object. However, such a detector has a problem that the detected boundary changes according to the given input parameter and threshold value, and the thickness of detected boundary is independent of the speed of motion of camera. In present invention, it recommended to use the following boundary detector by difference rather than a Canny edge detector.

The next table shows the sequence of capture:

TABLE 1

| time | Captured image |
|---|---|
| t − 2 | Mark image 0 |
| t − 1 | Ordinary image 1 |
| t | Mark image 2 |
| t + 1 | Ordinary image 3 |

If the current time is t, it is recommended to use the difference image as boundary image wherein the difference image is calculated between mark image 0 at time (t−2) and the mark image 2 at time (t) (In the present invention, such difference image is define as the boundary image by difference). The erosion operator can be applied to the boundary image in order to increase the thickness of boundary region.

By using the above method, the thickness of the detected boundary is proportional to the speed of the motion of camera. It means that the second order difference image is cleaner in step 5 because the thickness of regions of positive pixels in first order difference image and the thickness of the boundary image by difference are almost identical.

If boundary is detected by Canny edge detector in step 4 and the such detected boundary is used in step 5, then the boundary region may not be removed completely, because the thickness of such boundary by Canny edge detector is independent of speed of motion of camera but the thickness of boundary in 1st order difference image is variable (proportional to the speed of motion of camera).

The mark or mouse cursor icon detected by above method can be used for pointing. In other words, pointing signal can be generated so that the mouse cursor icon moves to the viewing direction of camera.

If user stop the pointing and put the camera on table, then the camera may capture the object which is not display. In this case, if there is a texture similar to mouse cursor icon around the monitor, then the image processing system of conventional technology, such as disclosed in the Korean Patent Number 10-0936816, may confuse the texture with mouse cursor icon.

However, by using the difference image algorithm of present invention, the image processing system can recognize that there is no mark because all pixel values of first order difference image are zero and can stop the next further image processing like calculating the second order difference. Namely, program can easily and quickly recognize the nonexistence of mark, stop further processing for mark detection (i.e., step for calculating the second order difference image) and reduce the load on CPU and reduce the power consumption. If the distance between camera and the display is long, then the mouse cursor in captured image is small and the image processing system may have difficulty to recognize the small mouse cursor icon.

However, the image processing system of present invention can detect the small mouse cursor icon because it is sufficient to detect positive pixels from the second order difference image even if the shape of mouse cursor icon is too small to be recognized. That is, the image processing system of present invention can stably detect mark at farther distance than conventional system.

Today, TV home shopping program displays QR code. By using QR code as mark, mark image and modified ordinary image can be displayed sequentially and alternately at high speed and the QR code can be detected by an image processing system of the present invention, wherein the modification means that the brightness of region corresponding to mark in ordinary image is decreased. Marks can also be displayed at the four vertices of display rectangle and can be detected and can be used for augmented reality by calculating the distance and direction between camera and marks.

Embodiment 2

The present embodiment is the modification of the Embodiment 1. The Embodiment 1 relates to the image processing system that calculates the difference image and detects mark wherein the difference image is calculated between two sequentially captured images wherein the first image is a composite image of black blank image (blank image is the image whose all pixel values are identical) and mark image and the second image is the modified ordinary image wherein the modification means that brightness of region corresponding to mark is decreased.

In comparison, the present embodiment display sequentially the first image and second image wherein the first image is the composite of first color (for example, red) component image of mark (for example, white mark) and the complementary color component image of the first color of ordinary image and the second image is the composite of complementary color component image of first color of mark and the first color component image of ordinary image.

For a given full color image, the first color (for example, red) component image means the image whose all the color component values (red, blue, green) except for the first color component (red) are modified to zero. If such color composed first and second image are displayed simultaneously, then user's eye senses it as full color image. By capturing the above color composed images sequentially as the Embodiment 1 and selecting the first color component images from the captured images, the mark region is bright and its background region of display is dark. This corresponds to the mark image MI in FIG. 2. By capturing the second image and selecting the first color component images from the captured images, the mark region is dark and its background region of display is bright. This corresponds to the ordinary image OI in FIG. 2.

By calculating the first order difference image from the above two images (in other words, difference between the first color component image MI of captured image of first image and the first color component image OI of captured image of second image), then the pixel values of mark region of difference image are positive and pixel values of the other region are negative or zero.

If the camera is moving, then boundary of object outside of display may produce the positive difference value. In this case, as shown in embodiment 1, mark region whose pixel value is positive can be obtained by removing the boundary region from the first order difference image wherein the boundary region is obtained by second order difference. Therefore, mark can easily be detected by searching the region of positive pixel value from the final difference image wherein the final difference image is obtained by first and second order difference process.

Embodiment 3

The present embodiment is the modification of the Embodiment 1. The embodiment 1 relates to the image processing system that calculates the difference image and detects mark wherein the difference image is calculated between two sequentially captured images wherein the first image is a composite image of black blank image (blank image is the image whose all pixel values are identical) and mark image and the second image is the modified ordinary image wherein the modification means that brightness of region corresponding to mark is decreased.

In comparison, the present embodiment displays sequentially black blank image and ordinary image instead of displaying the modified ordinary image wherein the modification means that brightness of region corresponding to mark is decreased. (The order of displaying may be changed. that is, dark blank image can be displayed after displaying the ordinary image.) In other words, the present embodiment relates to the image processing system that displays alternately and quickly the 3 kinds of images (mark image, blank image, and ordinary image) and detects mark by calculating the difference image between the captured mark image and the captured blank image. By using the method of present embodiment, it is not necessary to modify the ordinary image to decrease the brightness of mark region. Therefore, the problem is solved wherein the problem is that the mark blocks the ordinary image.

Namely, user can watch the semitransparent mark and can watch the ordinary image behind the mark because the non-modified (i.e., original) ordinary image and the mark image are displayed alternately and quickly wherein the modification means that the brightness of mark region is decreased.

But the method of Embodiment 1 has the problem that user can not watch the original image behind the mark because the brightness of mark region of ordinary image is decreased.

Embodiment 4

The present embodiment is the modification of the Embodiment 1. The Embodiment 1 relates to the image processing system that calculates the difference image and detects mark wherein the difference image is calculated between two sequentially captured images wherein the first image is a composite image of black blank image (blank image is the image whose all pixel values are identical) and mark image and the second image is the modified ordinary image wherein the modification means that brightness of region corresponding to mark is decreased.

In comparison, the present embodiment relates to the image processing system that the mark is invisible to user. For example, the small QR code is displayed during the TV home shopping program. It is uncomfortable for user to come close to the TV screen in order to capture the small QR code with smart phone camera for QR code recognition application because the small QR code is displayed at the corner of display so that the QR code does not block the ordinary image.

It is convenient that the mark is invisible for human eye but can be captured by camera and is big enough to cover the entire display region.

The present embodiment relates to the image processing system that displays the three kinds of image sequentially and detects mark by searching the no zero pixel value region of difference image between the captured first image and the captured second image wherein the first image is the composite image of mark and the black blank image, second image is the complementary color image of the first image and the third image is the ordinary image.

In the case of moving camera, it is recommended to detect mark by using further the second order difference image as described in embodiment 1 because the mark may not be detected by using only the first order difference image.

If the composite image of mark image and black blank image (first image) and its color complementary image (second image) are displayed quickly and alternately, then human eye sense it as the gray blank image and the mark is invisible but the high speed camera can capture the first and the second image separately and QR code can be easily detected from the difference image of the two captured images. The color complementary image means that addition of the pixel value of image and the pixel value of its color complementary image produces the white or gray pixel value. For example, If white pixel is defined as the color with red=255, green=255, blue=255 and the given input pixel value of ordinary image is red=125, green=100, blue=150, then the output color complementary pixel value is red=255−125, green=255−100, blue=255−150.

If the QR code is red with black background, then its color complementary image is cyan mark in white background.

Embodiment 5

The present embodiment is the modification of the Embodiment 4.

The present embodiment relates to the image processing system that displays the four kinds of images sequentially and detects mark from the difference image between the captured first image and the captured fourth image wherein the first image is the composite image of mark image and black blank image, second image is the color complementary image of the first image, third image is the ordinary image and the fourth image is the black blank image. By using the method of the present embodiment, the mark can be detected more easily than the Embodiment 4. In other words, in the case of moving camera, the first order difference image of Embodiment 4 is noisy but the first order difference image of present embodiment has clear mark.

Embodiment 6

The marks of above embodiments can be replaced with flickering light source.

For example, by switching traffic signal on and off quickly and repeatedly, capturing the traffic signal with camera whose shutter is synchronized with the flickering frequency, the traffic signal can be detected with the difference method of Embodiment 1. For example, if the frequency of flicker is 60 Hz, then human eyes sense that the light is switched on.

The captured image of switched on light source corresponds to the mark image of the Embodiment 1 and the captured image of switched off light source corresponds to the ordinary image.

By subtracting the ordinary image from the mark image, difference image can be obtained wherein the mark region of the difference image is bright. If the camera is moving, then boundary region of the nearby object around the light source also have bright pixel value. In this case, by removing the boundary region with second order difference as described in embodiment 1, only the region of light source come to have bright pixel value. Such flickering light source can be recognized by robot or automotive vehicles with the camera and the image processing means.

In the above embodiments, stereo image (image for left eye and image for right eye) for a shutter glass type 3-dimensional display can be displayed sequentially instead of displaying 1 kind of ordinary image. In this way, various kind of images can be displayed sequentially instead of displaying ordinary image. Recently, multi user TV which can display alternately images of different channels has been released wherein each user can watch different channel by wearing shutter glass. Such image of a plurality of different channels can be displayed alternately instead of ordinary image of the present embodiment.

The invention claimed is:

1. An image processing system comprising:
a display displaying a first image and displaying a second image, alternately, wherein the first image includes a mark;
a camera capturing frames of the first image and capturing frames of the second image; and
an image processing device calculating a first difference image between the first image and the second image, detecting a non-zero pixel region of the first difference image, detecting a boundary region of an object in the non-zero pixel region from a second difference image between two of the frames that are captured, removing the boundary region from the non-zero pixel region, and detecting the mark by searching for the mark in the non-zero pixel region of the first difference image from which the boundary region has been removed, wherein the second difference image between the two of the frames that are captured and from which the boundary region of the object is detected are one of: (i) a previous frame of the first image and a current frame of the first image; and (ii) a previous frame of the second image and a current frame of the second image.

2. The image processing system according to claim 1, wherein the first image is a mark image and the second image is an ordinary image.

3. The image processing system according to claim 2, wherein the ordinary image is modified such that brightness of pixels of a region corresponding to the mark is decreased.

4. The image processing system according to claim 1, wherein
the first image is a composite image of a first modified ordinary image and a first modified mark image,
the first modified mark image is a first color component image of the mark image and the first modified ordinary image is a first complementary color component image of an ordinary image, and the first complementary color component imaged has color components complementary to color components of the first color component image, the second image is a composite image of a second modified ordinary image and a second modified mark image, the second modified ordinary image is a second color component image of the ordinary image, and the second color component imaged has the same color components as the color components of the first color component image, the second modified mark image is a second complementary color component image of the mark image, and the second complementary color component image has color components complementary to the color components of the first color component image, and the image processing means detects the mark by searching a non-zero pixel region of a color difference image calculated between the first color component image of the first image that is captured and the second color component image of the second image that is captured.

5. The image processing system according to claim 1, wherein
the display further displays a third image sequentially and alternately with the first image and the second image,
the first image is a mark image,
the second image is a blank image, and
the third image is an ordinary image.

6. The image processing system according to claim 1, wherein
the display further displays a third image sequentially and alternately with the first image and the second image,
the first image is a mark image,
the second image is a complementary color image of the mark image, the complementary color image having color components complementary to color components of the mark image, and
the third image is an ordinary image.

7. The image processing system according to claim 1, wherein
the display further displays a third image and a fourth image sequentially and alternately with the first image and the second image,
the first image is a mark image,
the second image is a blank image,
the third image is an ordinary image, and
the fourth image is a complementary color image of the mark image, the complementary color image having color components complementary to color components of the mark image.

8. The image processing system according to claim 1, wherein
the first image is an image of a light source that is switched on;
the second image is an image of the light source that is switched off.

9. The image processing system according to claim 1, wherein:
the mark is a mouse cursor icon, and
the image processing device generates a pointing signal by searching the non-zero pixel region of the first difference image and by detecting the mouse cursor icon.

10. The image processing system according to claim 1, wherein:
the mark is a mark for augmented reality, or a character or a mark to represent information, and
the image processing device generates an augmented reality image by searching the non-zero pixel region of the first difference image, by detecting the mark, and by calculating a 3-dimensional relative position and direction between the camera and the mark.

11. An image processing method comprising:
capturing frames of a first image being displayed on a display alternately with a second image, the first image including a mark;
capturing frames of the second image;
calculating a first difference image between the first image and the second image;
detecting a non-zero pixel region from the first difference image;
detecting a boundary region of an object in the non-zero pixel region from a second difference image between two of the frames that are captured; and
removing the boundary region from the non-zero pixel region and detecting the mark by searching for the mark in the non-zero pixel region of the first difference image that excludes the boundary region, wherein the second difference image between the two of the frames that are captured and from which the boundary region of the object is detected include one of: (i) a previous frame of the first image and a current frame of the first image; and (ii) a previous frame of the second image and a current frame of the second image.

12. An image processing system comprising:
a display displaying a first image and displaying a second image, alternately;
a camera capturing the first image and capturing the second image; and
an image processing device detecting the mark from a non-zero pixel region of a difference image between the first image that is captured and the second image that is captured, wherein:
the first image contains the mark,
the first image is a composite image of a first modified ordinary image and a first modified mark image,
the first modified mark image is a first color component image of the mark image and the first modified ordinary image is a first complementary color component image of the ordinary image, and the first complementary color component image has color components complementary to color components of the first color component image,
the second image is a composite image of a second modified ordinary image and a second modified mark image,
the second modified ordinary image is a second color component image of the ordinary image, and the second color component image has the same color components as the color components of the first color component image,
the second modified mark image is a second complementary color component image of the mark image, and the second complementary color component image has color components complementary to the color components of the first color component image, and
the image processing means detects the mark by searching a non-zero pixel region of a color difference image calculated between the first color component image of the first image that is captured and the second color component image of the second image that is captured.

13. The image processing system according to claim 12, wherein the first image is a mark image and the second image is an ordinary image.

14. The image processing system according to claim 13, wherein the ordinary image is modified such that brightness of pixels of a region corresponding to the mark is decreased.

15. The image processing system according to claim 12, wherein
- the display further displays a third image sequentially and alternately with the first image and the second image,
- the first image is a mark image,
- the second image is a blank image, and
- the third image is an ordinary image.

16. The image processing system according to claim 12, wherein
- the display further displays a third image sequentially and alternately with the first image and the second image,
- the first image is a mark image,
- the second image is a complementary color image of the mark image, the complementary color image having color components complementary to color components of the mark image, and
- the third image is an ordinary image.

17. The image processing system according to claim 12, wherein
- the display further displays a third image and a fourth image sequentially and alternately with the first image and the second image,
- the first image is a mark image,
- the second image is a blank image,
- the third image is an ordinary image, and
- the fourth image is a complementary color image of the mark image, the complementary color image having color components complementary to color components of the mark image.

\* \* \* \* \*